No. 852,042. PATENTED APR. 30, 1907.
W. G. THUMMEL.
CAR CONSTRUCTION.
APPLICATION FILED OCT. 29, 1906.
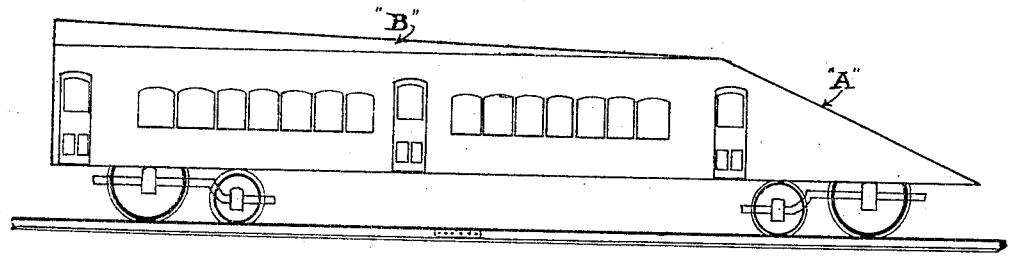
Witnesses—
Inventor
W. G. Thummel.

UNITED STATES PATENT OFFICE.

WILLIAM G. THUMMEL, OF ST. LOUIS, MISSOURI.

CAR CONSTRUCTION.

No. 852,042.　　　　Specification of Letters Patent.　　　Patented April 30, 1907.

Application filed October 29, 1906. Serial No. 341,168.

To all whom it may concern:

Be it known that I, WILLIAM G. THUMMEL, a citizen of the United States, residing at St. Louis, Missouri, have invented a certain new and useful Improvement in Car Construction, of which the following is a full, clear, and exact description, such as will enable others skilled in the art to which it appertains to make and use the same, reference being had to the accompanying drawings, forming part of this specification, in which the figure is a side elevation of a car embodying the features of my invention.

This invention relates to cars, and particularly to passenger cars of that type in which the motor or mechanism for propelling the car is mounted in or carried by the car.

The object of my invention is to provide a passenger car which is constructed to lessen the aerial resistance and increase the traction of adhesion, thereby enabling the car to attain a high rate of speed without liability of jumping the track upon which it travels. To this end, I provide the car with an inclined front end A which is flat and extends rearwardly to a point intermediate the transverse center of the car and the end sill where it merges into the roof B. Said end rises gradually from the end sill so that at the point where it merges into the roof the inside height of the front end is approximately the same as the inside clearance of the ordinary car. The roof B is also flat and inclined upwardly and rearwardly from its junction with the front end A.

In the portion of the car under the inclined front end A I locate the motor or propelling mechanism so that the major portion of the car can be utilized for carrying passengers.

Having thus described my invention, what I claim as new and desire to secure by Letters Patent is;

A passenger car having a flat front end A which rises gradually from the end sill and merges into the roof B intermediate the transverse center of the car and the front end sill, said roof being flat and rising gradually from its junction with the front end; substantially as described.

W. G. THUMMEL.

Witnesses:
　CHARLES M. LANE,
　J. LANDAUER.